US012597050B2

(12) United States Patent
Fang et al.

(10) Patent No.: US 12,597,050 B2
(45) Date of Patent: Apr. 7, 2026

(54) SYSTEMS AND METHODS FOR DETERMINING A DYNAMIC BID FOR A RANKING SYSTEM

(71) Applicant: Walmart Apollo, LLC, Bentonville, AR (US)

(72) Inventors: Biyi Fang, Palo Alto, CA (US); Anish Saha, Mountain View, CA (US); Xinzi Sun, Redwood City, CA (US); Dong Xu, Sunnyvale, CA (US); Kritika Upreti, Sunnyvale, CA (US); Mohit Prakash Patel, San Jose, CA (US); Jayanth Korlimarla, Sunnyvale, CA (US); Jiaxuan Xu, Jersey City, NJ (US); Musen Wen, Mountain View, CA (US); Ramakanth Putta, Milpitas, CA (US); Naga Vijay Bhaskar Manchi, Campbell, CA (US); Valeriy Valeryevich Pelyushenko, San Jose, CA (US); Ranjit Kumar Pedapati, Saratoga, CA (US); Rajesh Garigipati, Dublin, CA (US); Anant Furia, San Jose, CA (US); Kuang-Chih Lee, Fremont, CA (US); Chintan Jagdish Rita, Sunnyvale, CA (US); Wei Shen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 24 days.

(21) Appl. No.: 18/428,267

(22) Filed: Jan. 31, 2024

(65) Prior Publication Data

US 2025/0245694 A1     Jul. 31, 2025

(51) Int. Cl.
*G06Q 30/02*      (2023.01)
*G06Q 30/0241*      (2023.01)
(Continued)

(52) U.S. Cl.
CPC ..... *G06Q 30/0247* (2013.01); *G06Q 30/0246* (2013.01); *G06Q 30/0275* (2013.01)

(58) Field of Classification Search
CPC ........... G06Q 30/0247; G06Q 30/0246; G06Q 30/0275
See application file for complete search history.

(56) References Cited

U.S. PATENT DOCUMENTS

| | | | |
|---|---|---|---|
| 2007/0027766 A1* | 2/2007 | Collins | .............. G06Q 30/0256 705/14.51 |
| 2015/0348139 A1* | 12/2015 | Silverman | .............. G06Q 30/02 705/14.71 |

OTHER PUBLICATIONS

Adlucent—A Retailer's Guide to Performance Max: Testing and Optimizing Asset Groups., Retrieved from: https://www.adlucent.com/resources/blog/performance-max-testing-and-optimizing-asset-groups/ 2024.

(Continued)

*Primary Examiner* — Breffni Baggot
(74) *Attorney, Agent, or Firm* — FOLEY & LARDNER LLP

(57) ABSTRACT

Systems and methods including one or more processors and one or more non-transitory storage devices storing computing instructions configured to run on the one or more processors and perform: receiving a search query from a user and user session information; receiving input information corresponding to one or more campaigns to display to the user; determining a first bid for the one or more campaigns based on the search query and the user session information; determining a second bid for the one or more campaigns based on the input information; determining a final bid for the one or more campaigns based on the first bid and the second bid; transmitting the final bid to a ranking system to generate a listing of advertisements, the listing of advertisements including positioning information; and (Continued)

enabling a graphical user interface to be modified to reposition the listing of advertisements based on the positioning information. Other embodiments are disclosed herein.

20 Claims, 13 Drawing Sheets

(51) Int. Cl.
   *G06Q 30/0242*     (2023.01)
   *G06Q 30/0273*     (2023.01)

(56)                References Cited

OTHER PUBLICATIONS

Google—Display Smart Bidding Guide., Retrieved from: https://services.google.com/fh/files/misc/external_display_smart_bidding_guide_2018_en.pdf 2018.
Guide to dynamic bidding—up and down, with Sponsored Products | Amazon Ads., Retrieved from: https://advertising.amazon.com/library/guides/dynamic-bidding-sponsored-products 2020.

* cited by examiner

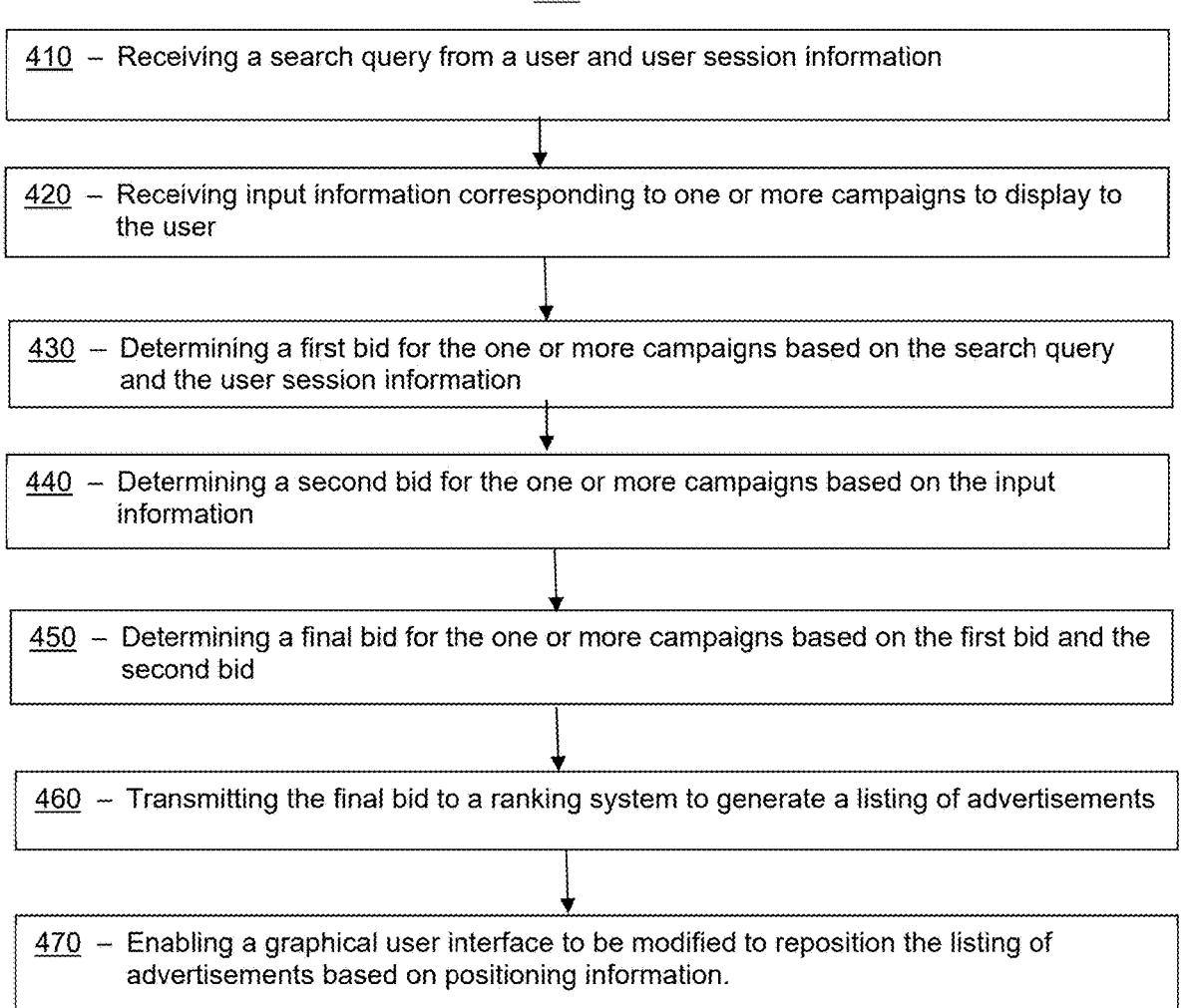

400

410 – Receiving a search query from a user and user session information

420 – Receiving input information corresponding to one or more campaigns to display to the user 430 – Determining a first bid for the one or more campaigns based on the search query and the user session information 440 – Determining a second bid for the one or more campaigns based on the input information 450 – Determining a final bid for the one or more campaigns based on the first bid and the second bid 460 – Transmitting the final bid to a ranking system to generate a listing of advertisements 470 – Enabling a graphical user interface to be modified to reposition the listing of advertisements based on positioning information.

RoAS_threshold

BBU and campaign level ad revenue
and sales revenue

*monthly*

Campaign and bbu level
RoAS threshold

508

Aggregate historical average bid

Bid price for all clicks for BBU

*daily*

Day Parting Factor

Campaign level number of order
and ad revenue

*daily*

Campaign-module-location-hour
level PDF multiplier

510

514

520

600

SYSTEMS AND METHODS FOR DETERMINING A DYNAMIC BID FOR A RANKING SYSTEM

TECHNICAL FIELD

This disclosure relates generally to computing system management, and more particular to systems and methods for determining a dynamic bid for a ranking system.

BACKGROUND

Marketplaces are responsible for millions of products at a time. With so many products offered for sale, it can be difficult for a customer to find a desired product through a search. Many marketplaces offer participants an ability to bid on advertising space to display to users. However, the large number of products and constant variation of a user search session hinders participants from displaying relevant products to relevant users.

BRIEF DESCRIPTION OF THE DRAWINGS

To facilitate further description of the embodiments, the following drawings are provided in which:

FIG. 4 illustrates a flowchart for a method, according to certain embodiments;

Figure 1:
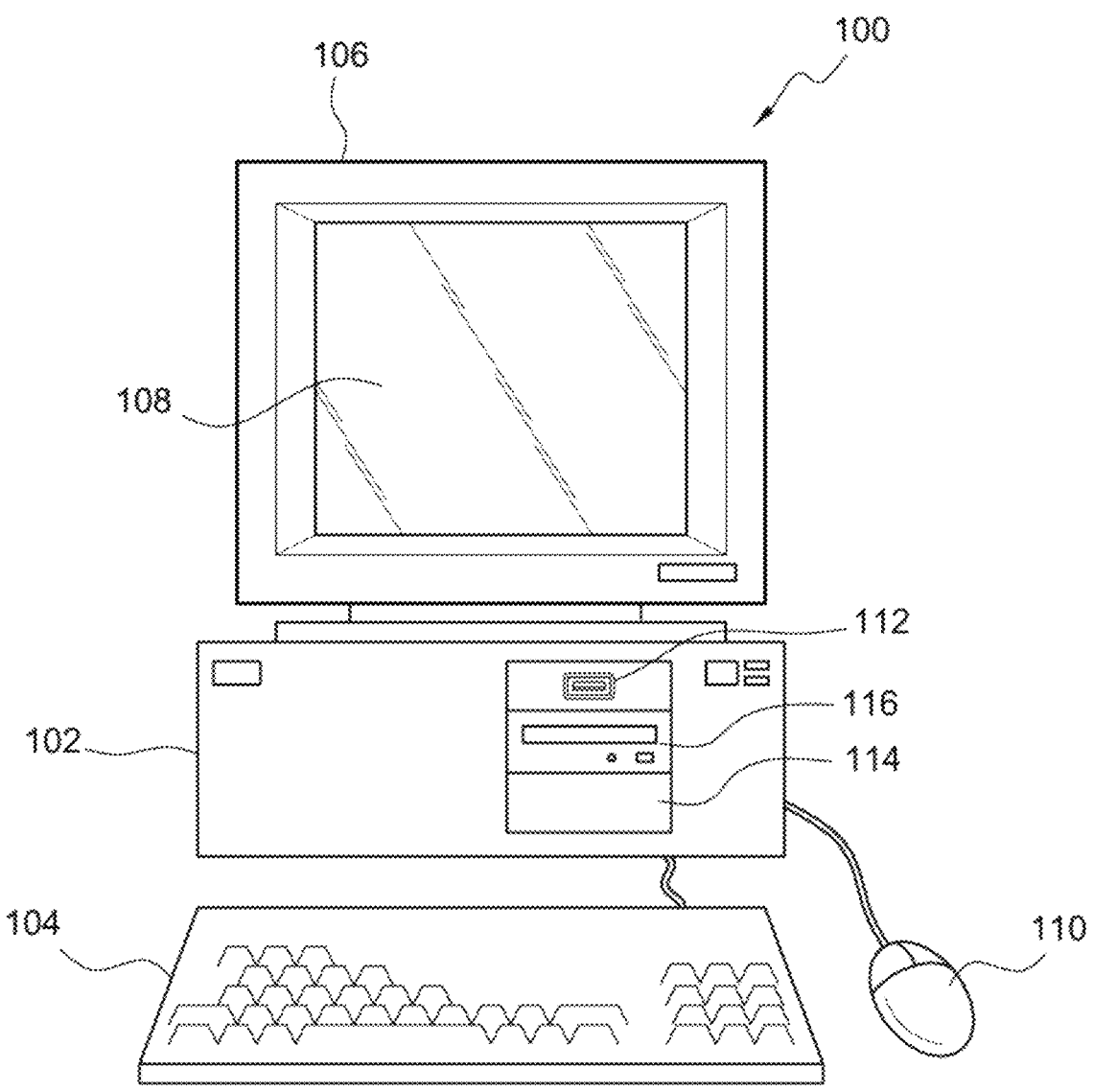
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform: receiving a search query from a user and user session information; receiving input information corresponding to one or more campaigns to display to the user; determining a first bid for the one or more campaigns based on the search query and the user session information; determining a second bid for the one or more campaigns based on the input information; determining a final bid for the one or more campaigns based on the first bid and the second bid; transmitting the final bid to a ranking system to generate a listing of advertisements, the listing of advertisements including positioning information; and enabling a graphical user interface to be modified to reposition the listing of advertisements based on the positioning information.

Various embodiments include a method. The method can be implemented via execution of computing instructions configured to run at one or more processors and configured to be stored at non-transitory computer-readable media. The method can comprise receiving a search query from a user and user session information; receiving input information corresponding to one or more campaigns to display to the user; determining a first bid for the one or more campaigns based on the search query and the user session information; determining a second bid for the one or more campaigns based on the input information; determining a final bid for the one or more campaigns based on the first bid and the second bid; transmitting the final bid to a ranking system to generate a listing of advertisements, the listing of advertisements including positioning information; and enabling a graphical user interface to be modified to reposition the listing of advertisements based on the positioning information.

Figure 2:
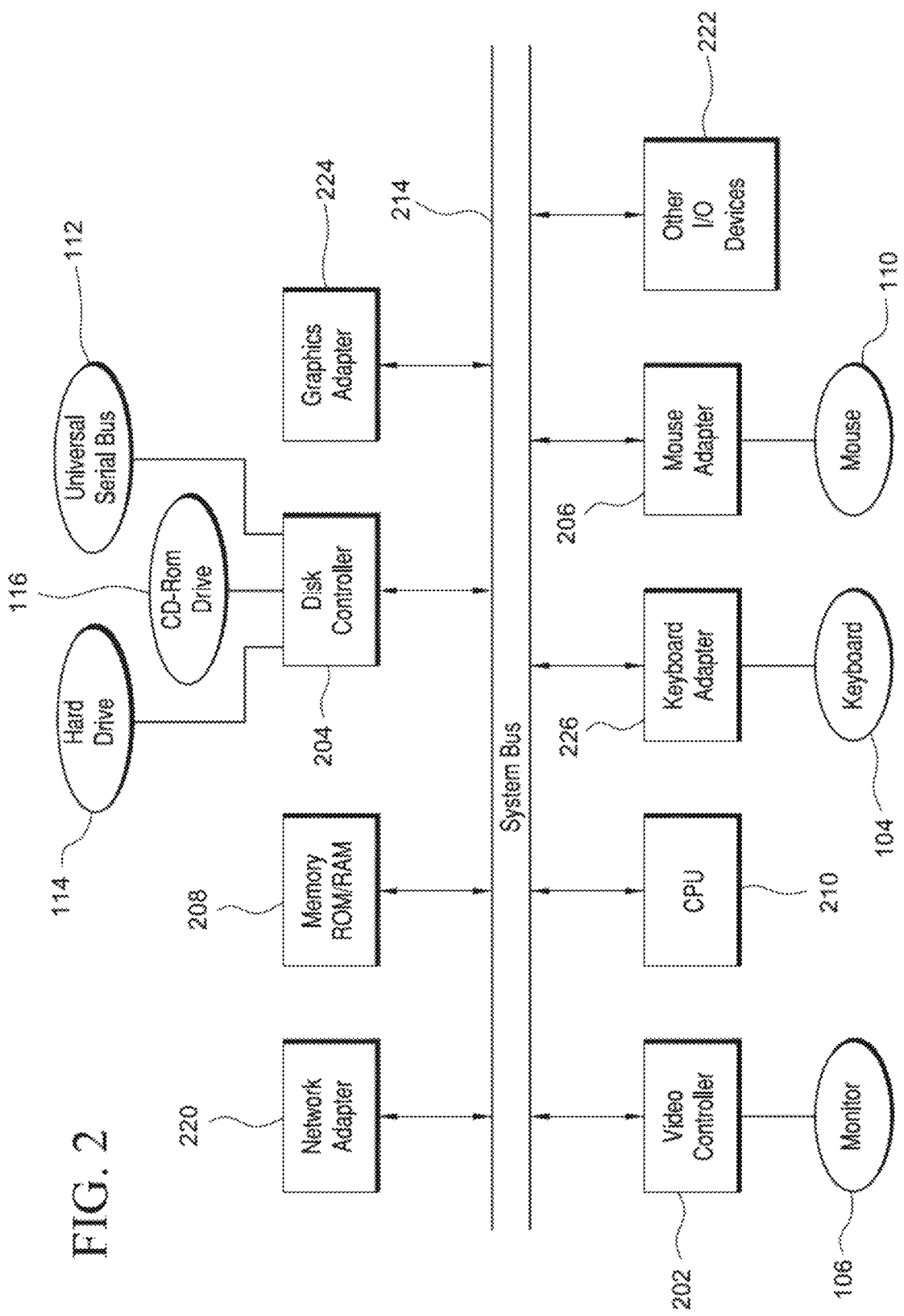
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
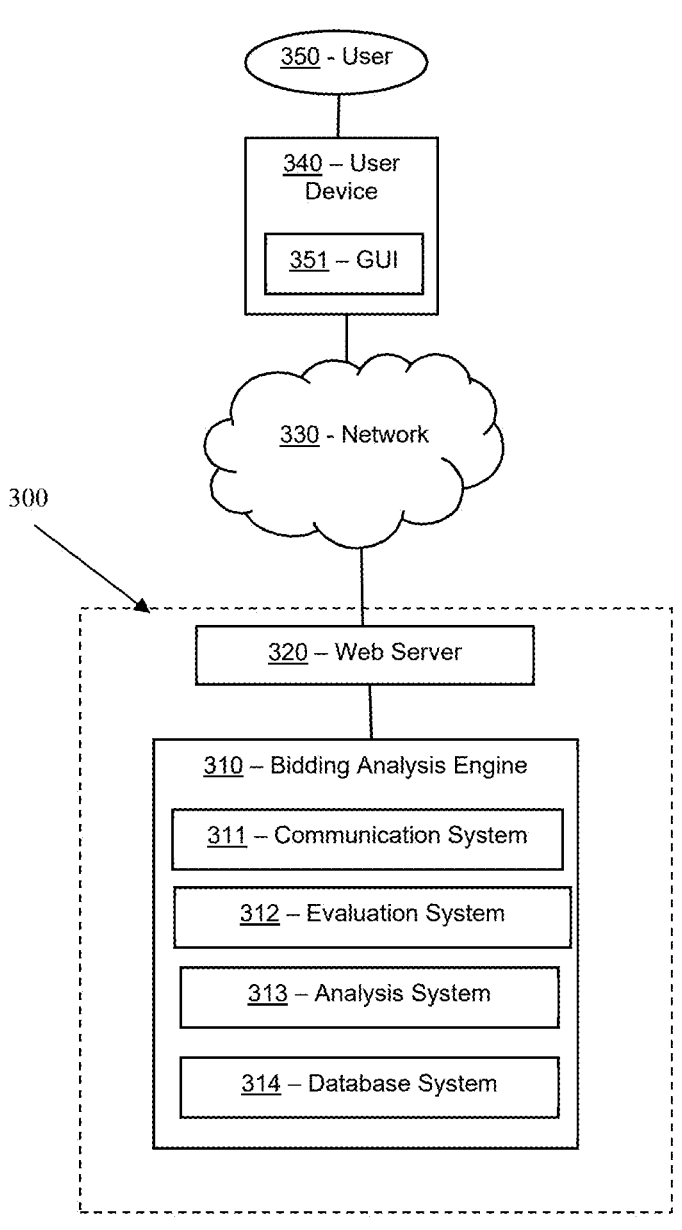
FIG. 3 illustrates a representative block diagram of a system, according to an embodiment.

Turning ahead in the drawings, FIG. 3 illustrates a block diagram of a system 300 that can be employed for dynamic bidding analysis, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a bidding analysis engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Bidding analysis engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host bidding analysis engine 310 and/or web server 320. Additional details regarding bidding analysis engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with bidding analysis engine 310, in addition to other suitable activities. In a number of embodiments, web server 320 can interface with bidding analysis engine 310 when a user (e.g., 350) is viewing infrastructure components in order to assist with the analysis of the infrastructure components corresponding to dynamic bidding.

In some embodiments, an internal network that is not open to the public can be used for communications between bidding analysis engine 310 and web server 320 within system 300. Accordingly, in some embodiments, bidding analysis engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, bidding analysis engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to bidding analysis engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of bidding analysis engine 310 and/or web server 320. In a similar manner, the processors and/or the non-transitory computer-readable media can be local and/or remote to each other.

Meanwhile, in many embodiments, bidding analysis engine 310 and/or web server 320 also can be configured to communicate with one or more databases, such as a database system 314. The one or more databases can include bidding information, user engagement information, campaign information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG.

1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Data-base, and IBM DB2 Database.

Meanwhile, bidding analysis engine 310, web server 320, and/or the one or more databases can be implemented using any suitable manner of wired and/or wireless communica-tion. Accordingly, system 300 can include any software and/or hardware components configured to implement the wired and/or wireless communication. Further, the wired and/or wireless communication can be implemented using any one or any combination of wired and/or wireless com-munication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Insti-tute of Electrical and Electronic Engineers (IEEE) 802.3 (also known as Ethernet), IEEE 802.11 (also known as WiFi), etc.; and exemplary wireless cellular network proto-col(s) can include Global System for Mobile Communica-tions (GSM), General Packet Radio Service (GPRS), Code Division Multiple Access (CDMA), Evolution-Data Opti-mized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols imple-mented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more network-ing components (e.g., modulator-demodulator components, gateway components, etc.).

In many embodiments, bidding analysis engine 310 can include a communication system 311, an evaluation system 312, an analysis system 313, and/or database system 314. In many embodiments, the systems of bidding analysis engine 310 can be modules of computing instructions (e.g., soft-ware modules) stored at non-transitory computer readable media that operate on one or more processors. In other embodiments, the systems of bidding analysis engine 310 can be implemented in hardware. bidding analysis engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host bidding analysis engine 310 and/or web server 320. Additional details regarding bidding analysis engine 310 and the components thereof are described herein.

In many embodiments, user device 340 can comprise graphical user interface ("GUI") 351. In the same or differ-ent embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodi-ments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user devices 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, bidding analysis engine 310, and/or web server 320 can be configured to communicate with one or more user devices 340. In some embodiments, user devices 340 also can be referred to as customer computers. In some embodiments, bidding analysis engine 310, and/or web server 320 can communicate or interface (e.g., interact) with one or more customer computers (such as user devices 340) through a network 330. Network 330 can be an intranet that is not open to the public. In further embodiments, network 330 can be a mesh network of individual systems. Accordingly, in many embodiments, bidding analysis engine 310, and/or web server 320 (and/or the software used by such systems) can refer to a back end of system 300 operated by an operator and/or administrator of system 300, and user device 340 (and/or the software used by such systems) can refer to a front end of system 300 used by one or more users 350, respectively. In some embodiments, users 350 can also be referred to as customers, in which case, user device 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as bidding analysis engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving a search query from a user and user session information. In some embodiments, activity 410 can include determining query content for the search query. In some embodiments, the query content corresponds to at least one of a title, a product type, a department, or a brand. In some embodiments, activity 410 can include determining a user intent based on the query content and the user session information. For example, a user can input a search query for "television" and from the user session information activity 410 can determine that the user only clicked on televisions that were from a certain company. As such, a user intent can be inferred that the user was intending to search for televisions from the certain company.

In many embodiments, method 400 can comprise an activity 420 of receiving input information corresponding to one or more campaigns to display to the user. In some embodiments, the input information includes at least one of campaign information, order information, and interaction information for the one or more campaigns. For example, the interaction information can include impressions, add-to-carts, and purchases.

In many embodiments, method 400 can comprise an activity 430 of determining a first bid for the one or more campaigns based on the search query and the user session information. In some embodiments, the first bid is a conversion rate (pCVR) bid. In some embodiments, determining the pCVR bid for the one or more campaigns includes using an equation comprising:

$$pCVR \text{ based Bid} = \frac{cvr_i}{CoAS_{goal}}$$

wherein $cvr_i$ corresponds to a conversion rate for the one or more items, and $CoAS_{goal}$ corresponds to a potential conversion return on advertisement spending.

In many embodiments, method 400 can comprise an activity 440 of determining a second bid for the one or more campaigns based on the input information. In some embodiments, the second bid is a conversion return on advertisement spending (RoAS) bid. In some embodiments, determining the conversion RoAS bid for the one or more campaigns further comprises determining a RoAS bid based on input information. In some embodiments, determining the conversion RoAS bid for the one or more campaigns further comprises determining a cost on advertisement spending (CoAS) bid based on the input information. In some embodiments, determining the conversion RoAS bid for the one or more campaigns further comprises aggregating the RoAS bid and the CoAS bid to determine the conversion RoAS bid.

In some embodiments, determining the RoAS bid includes using an equation comprising:

$$\frac{RoAS_i}{RoAS_{campaign}}$$

Wherein RoAS_i is an item's RoAS, where RoAS corresponds to an ad's sales revenue/ad spend, indicative of the return of investment for the item. RoAS_campaign is the campaign's RoAS. RoAS_campaign is a campaign's sales revenue/campaign ad spend, which is indicative of a campaign's return of investment.

In some embodiments, determining the CoAS bid includes using an equation comprising:

$$\frac{CoAS_i}{CoAS_{campaign}}$$

Wherein CoAS is an order volume/ad spend. CoAS_i is the ad item's CoAS, while CoAS_campaign is the campaign's CoAS.

In some embodiments, aggregating the RoAS bid and the CoAS bid to determine the conversion RoAS bid includes using an equation comprising:

$$\text{dynamic bid}_i(t+1) = \text{avg\_bid}_i(t - \text{delta}, t) \times$$

$$\sqrt{\overline{w}_1 \cdot \underset{CoAS\_bidController}{\frac{CoAS_i}{CoAS_{campaign}}} + \overline{w}_2 \cdot \underset{RoAS\_bidController}{\frac{RoAS_i}{RoAS_{campaign}}}} \cdot \text{day\_part\_adj}_{campaign}(t+1)$$

Wherein Dynamic bid_i(t+1) is the dynamic bid of item i for the next use case. avg_bid_i(t–delta, t) is the average of bid price of item i in the time window from t-delta to t. W1 and w2 are two weights. CoAS_bidController and RoAS_bidController are explained above. day_part_adj_campaign (t+1) is a campaign and hour level adjustment factor applied to bid to capture the campaign and hourly level variation of the shopper behavior.

In many embodiments, method 400 can comprise an activity 450 of determining a final bid for the one or more campaigns based on the first bid and the second bid. For example, the first bid and the second bid can be combined together as either a ratio, a product, a difference, or a summation.

In many embodiments, method 400 can comprise an activity 460 of transmitting the final bid to a ranking system to generate a listing of advertisements. In some embodiments, the listing of advertisements includes positioning information. For example, the positioning information corresponds to a position within a graphical user interface a certain advertisement is to be placed based on the final bid.

In many embodiments, method 400 can comprise an activity 470 of enabling a graphical user interface to be modified to reposition the listing of advertisements based on the positioning information. For example, based on the final bid, the original ranking and positioning of the advertisements is modified to re-position the advertisements based on the final bid.

Turning to FIGS. 5A-5H illustrate components of a dynamic bidding system that can be utilized to implement the method 400 (FIG. 4), according to an embodiment.

Figure 5A:
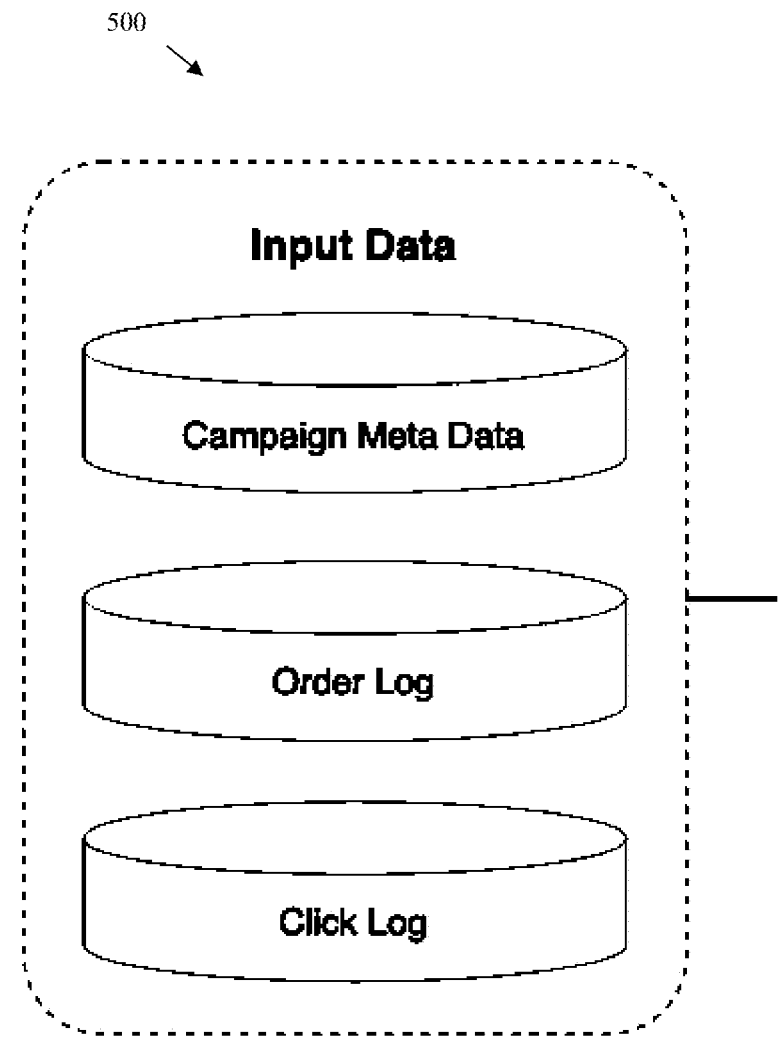
FIG. 5A illustrates exemplary input information, according to certain embodiments.

FIG. 5A illustrates exemplary input information 500 that can be received in activities 410 and 420.

Figure 5B:
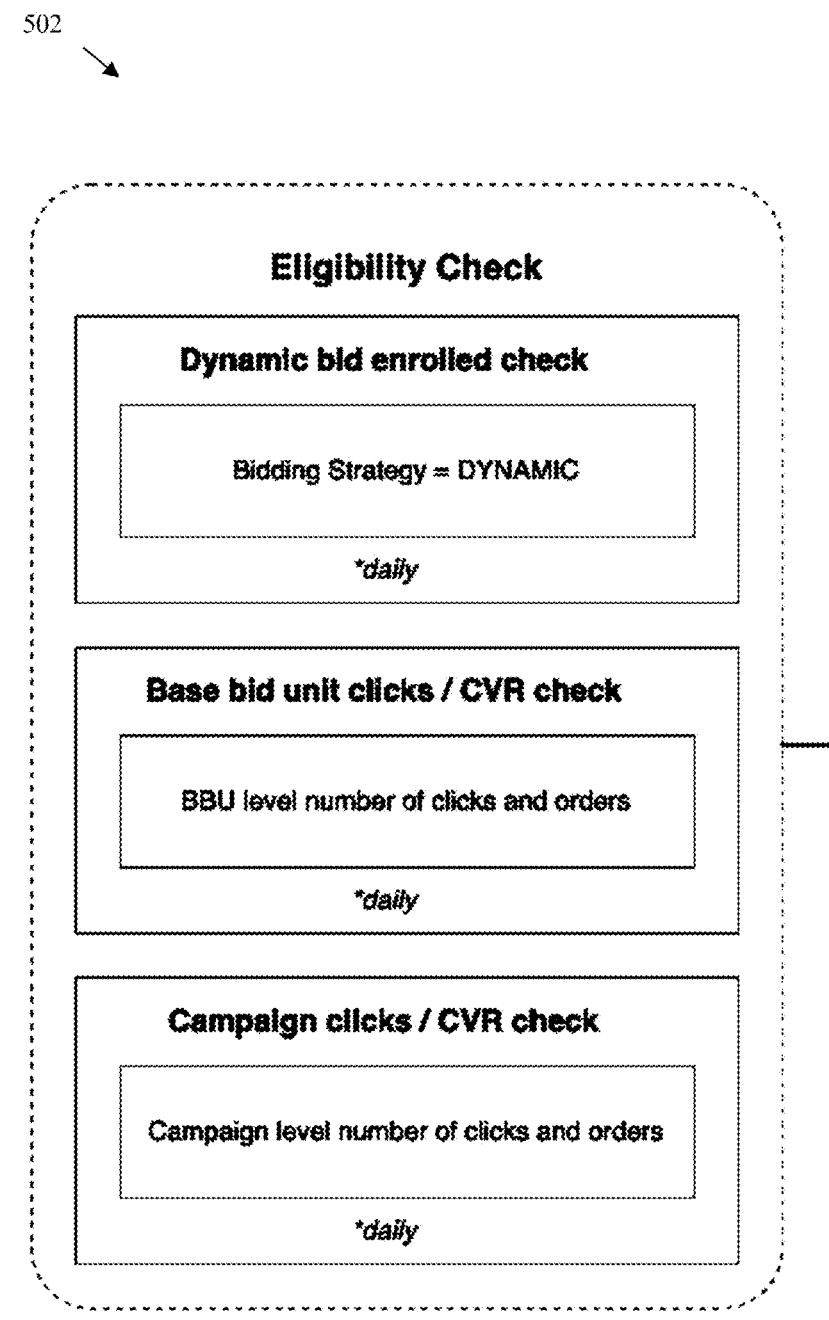
FIG. 5B illustrates an exemplary eligibility check, according to certain embodiments.

FIG. 5B illustrates an exemplary eligibility check 502 that can be performed on the input information 500. In the illustrated embodiment, the eligibility check 502 includes a dynamic bid enrolled check, a base bid unit clicks/conversion rate (CVR) check, and a campaign clicks/CVR check. In some embodiments, the dynamic bid enrolled check analyzes bidding strategy information. In some embodiments, the base bid unit clicks/CVR check analyzes a base bid unit level number of clicks and orders. In some embodiments, the campaign clicks/CVR check analyzes campaign level number of clicks and orders. The eligibility check 502 can remove any input information 500 that does not satisfy one or more thresholds at each of the dynamic bid enrolled check, the base bid unit clicks/CVR check, and the campaign clicks/CVR check.

Figure 5C:
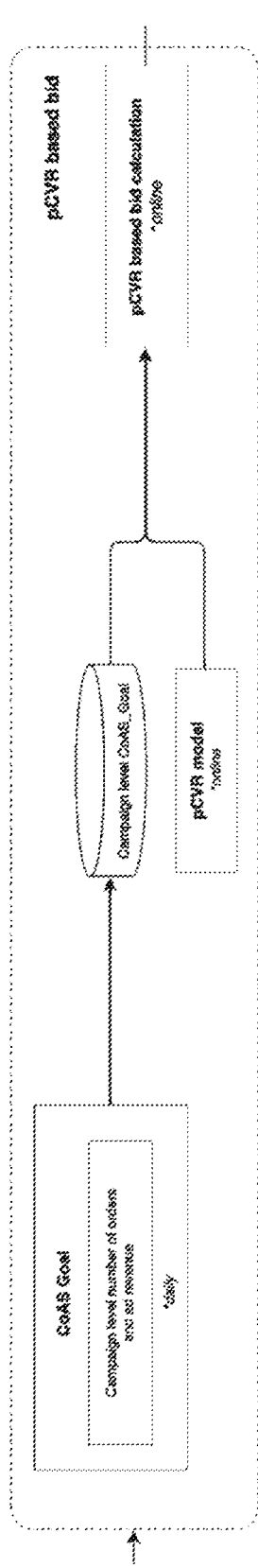
FIG. 5C illustrates an exemplary pCVR based bid function, according to certain embodiments.

FIG. 5C illustrates an exemplary pCVR based bid function 504, according to an embodiment. In the illustrated embodiment, the pCVR based bid function 504 receives the input information 500 that passed the eligibility check 502. In some embodiments, the pCVR based bid function 504 analyzes input information corresponding to a campaign level number of orders and ad revenue and determines a campaign level CoAS goal. The campaign level CoAS goal is utilized with the activity 430 (FIG. 4) to determine the pCVR bid (e.g., the first bid).

Figure 5D:
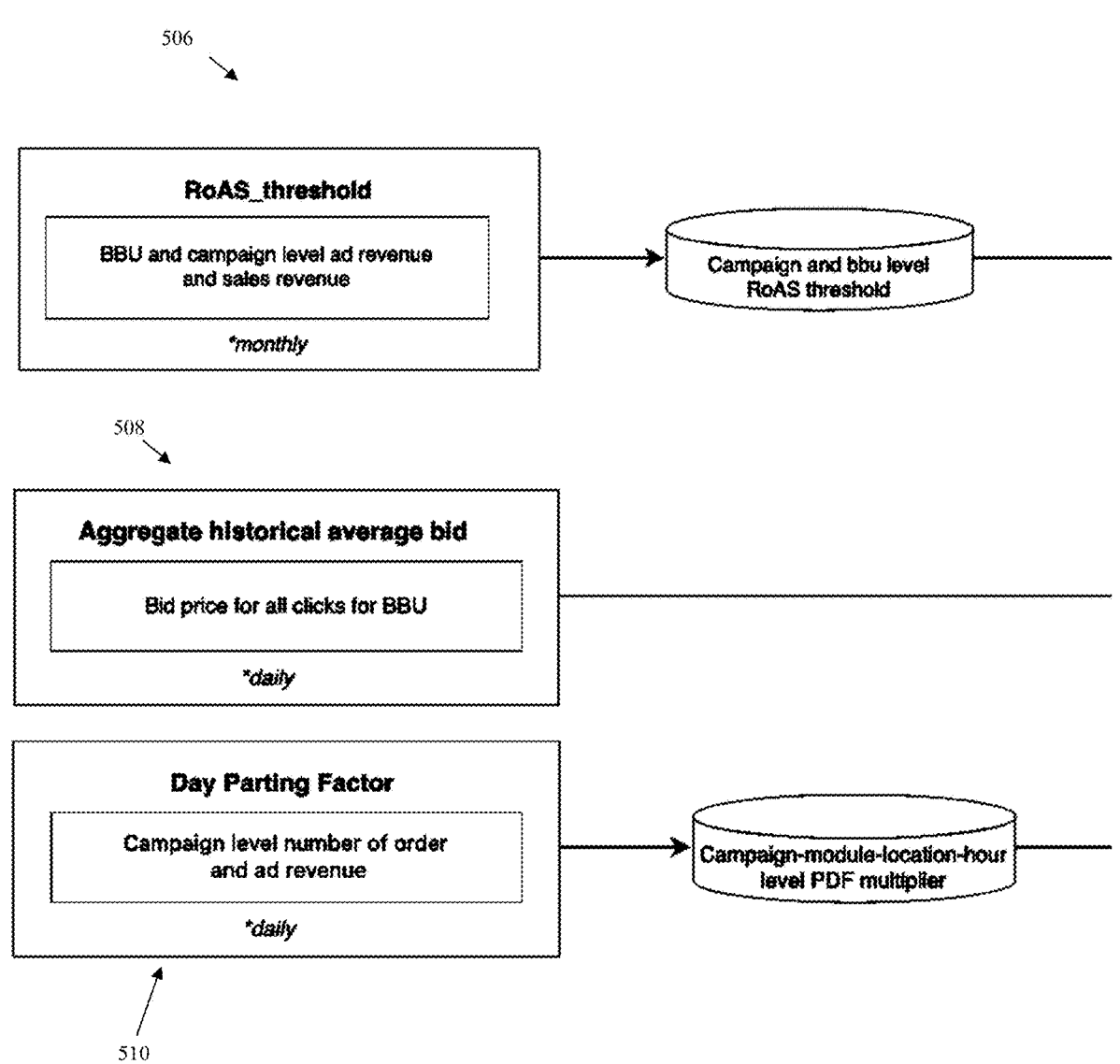
FIG. 5D illustrates an exemplary threshold function, an exemplary aggregate function, and an exemplary day parting function, according to certain embodiments.

FIGS. 5D-5G correspond to a conversion RoAS based bid function. FIG. 5D corresponds to a threshold function 506 that analyzes input information corresponding to base bid unit and campaign level ad revenue and sales revenue to determine a campaign and base bid unit RoAS threshold, an aggregate function 508 that analyzes input information corresponding to bid price for all clicks for base bid unit, and a day parting function 510 that analyzes input information corresponding to campaign level number of orders and ad revenue to determine a campaign module location hour level PDF multiplier.

Figure 5E:
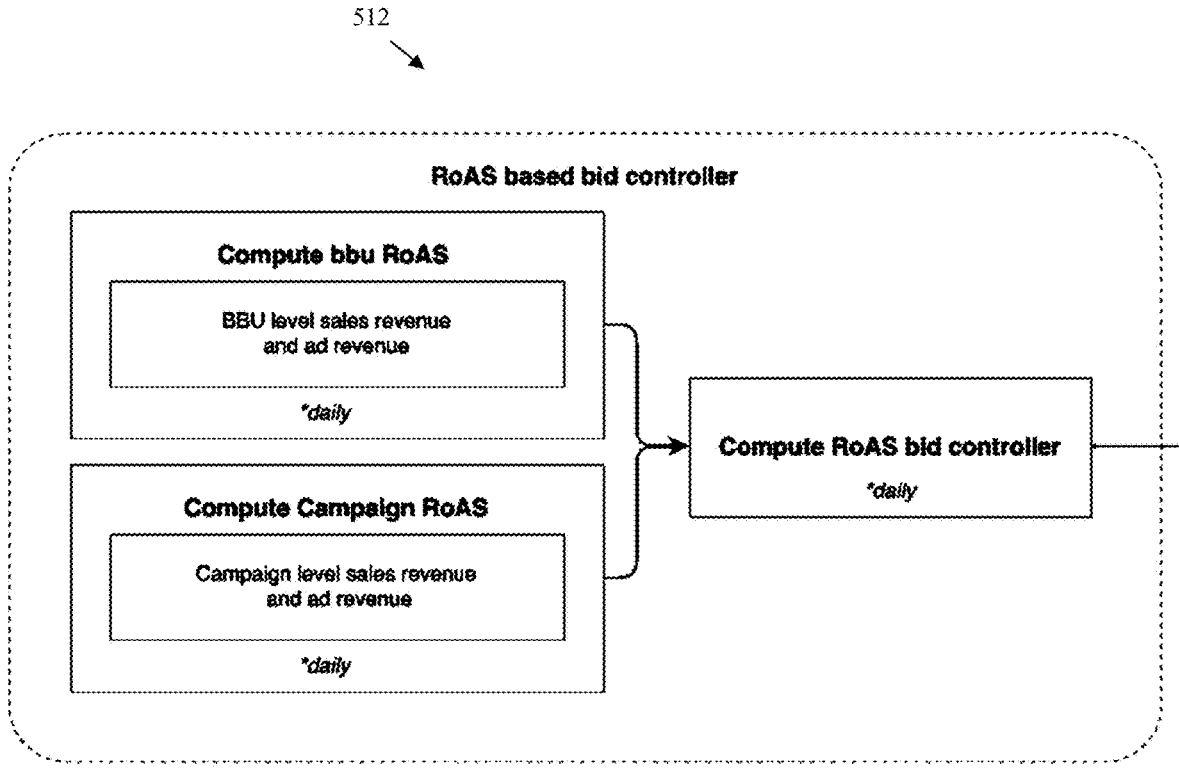
FIG. 5E illustrates an exemplary RoAS based bid controller, according to certain embodiments.

FIG. 5E illustrates a RoAS based bid controller 512, according to an embodiment. The RoAS based bid controller 512 includes a compute base bid unit RoAS function that analyzes input information corresponding to base bid unit level sales revenue and ad revenue, and a compute campaign RoAS function that analyzes input information corresponding to campaign level sales revenue and ad revenue. The outputs of the compute base bid unit RoAS function and the compute campaign RoAS function are transmitted for further processing.

Figure 5F:
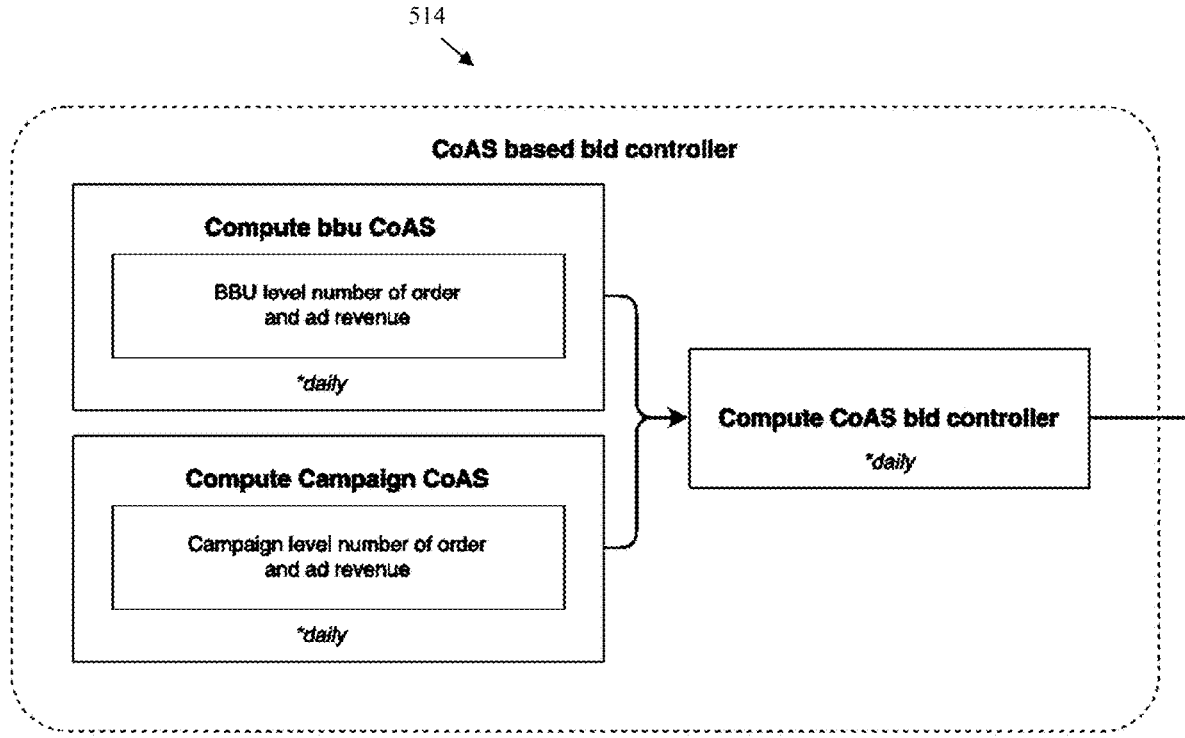
FIG. 5F illustrates an exemplary CoAS based bid controller, according to certain embodiments.

FIG. 5F illustrates a CoAS based bid controller 514, according to an embodiment. The CoAS based bid controller 514 includes a compute base bid unit CoAS function that analyzes input information corresponding to base bid unit level number of orders and ad revenue, and a compute campaign CoAS function that analyzes input information corresponding to campaign level number of orders and ad revenue. The outputs of the compute base bid unit CoAS function and the compute campaign CoAS function are transmitted for further processing.

Figure 5G:
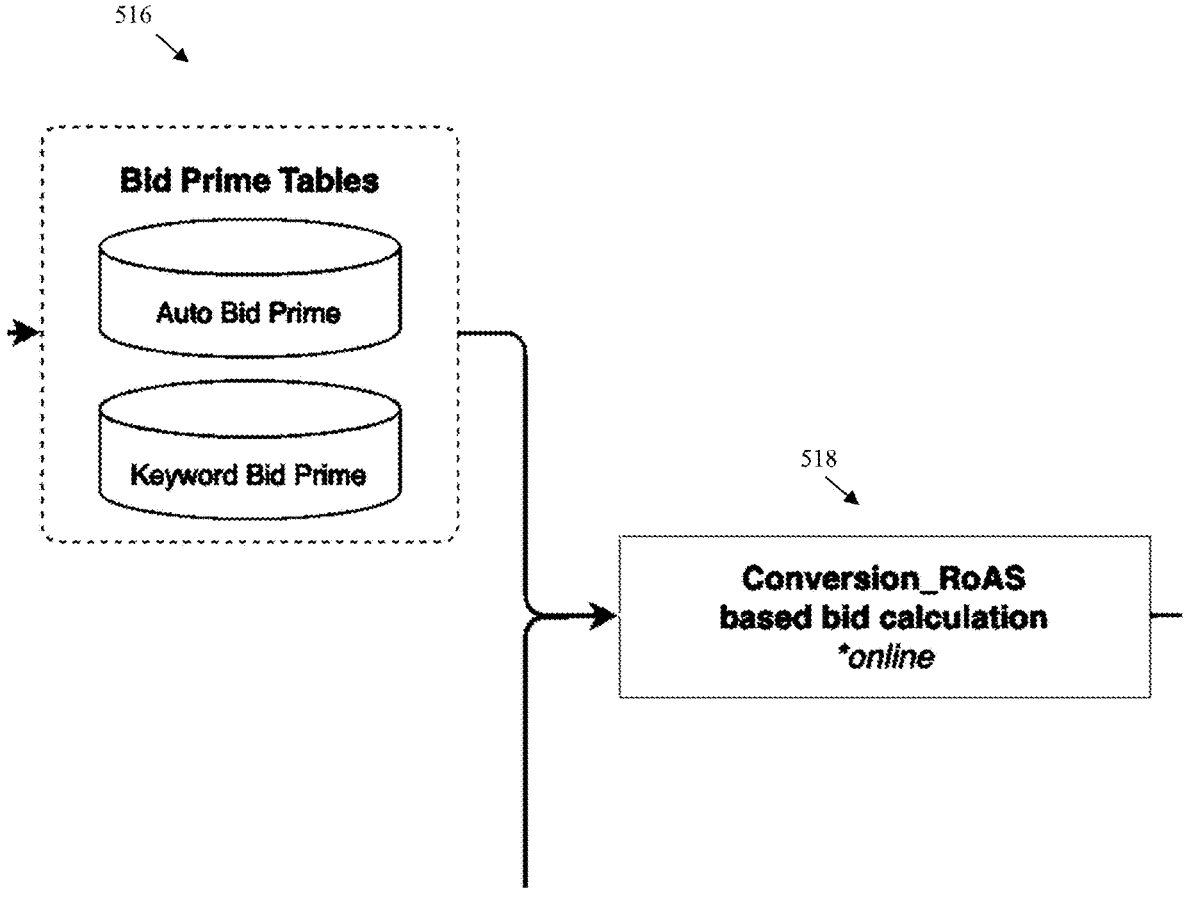
FIG. 5G illustrates an exemplary bid prime function and an exemplary conversion RoAS based bid calculation function, according to certain embodiments.

FIG. 5G illustrates a bid prime function 516 and a conversion RoAS based bid calculation function 518. The bid prime function 516 receives the outputs from the threshold function 506, the RoAS based bid controller 512, and the CoAS based bid controller 514. The bid prime function determines an auto bid and a keyword bid. The output is transmitted to the conversion RoAS based bid calculation function 518, along with the outputs from the aggregate function 508, and the day parting function 510. In some embodiments, the conversion RoAS based bid calculation function 518 utilizes activity 430 (FIG. 4) to determine the conversion RoAS based bid (e.g., the second bid).

Figure 5H:
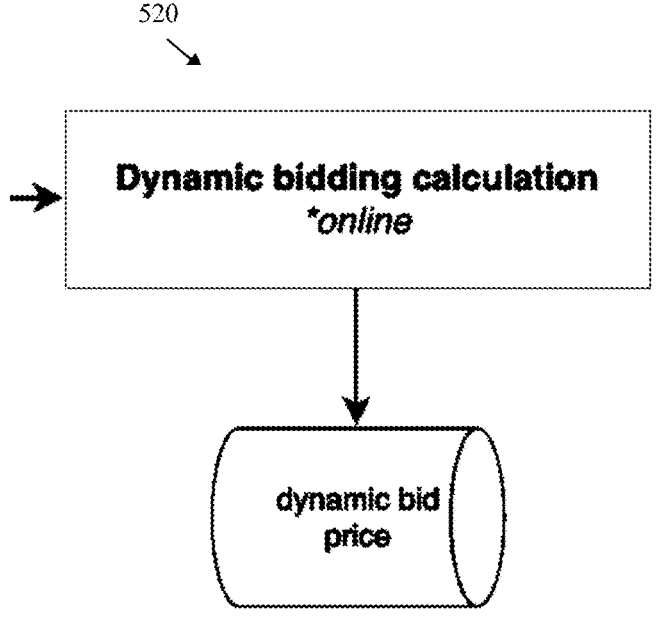
FIG. 5H illustrates an exemplary dynamic bidding calculation function, according to certain embodiments.

FIG. 5H illustrates a dynamic bidding calculation function 520 that generates a dynamic bid price (e.g., the final bid in activity 450 (FIG. 4)) based on the output from the pCVR based bid function 504 and the conversion RoAS based bid calculation function 518.

Figure 6:
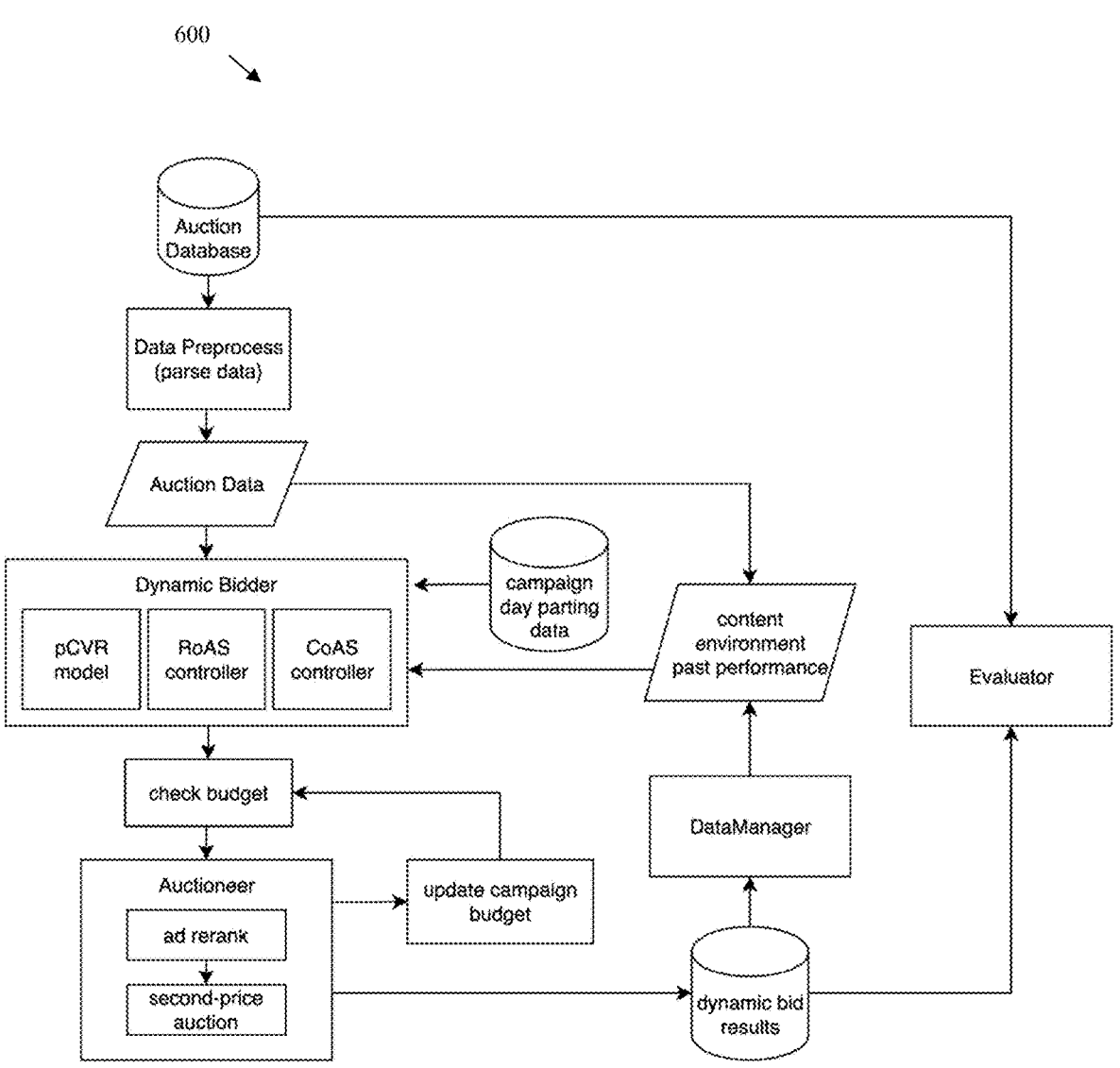
FIG. 6 illustrates an exemplary system architecture, according to certain embodiments.

FIG. 6 illustrates an exemplary system architecture 600 according to an embodiment. Embodiments disclosed herein can include building a modeling engine based on the first bid, the second bid, and the final bid. In some embodiments, each of the first bid, the second bid, and the final bid correspond to separate modeling functions in the modeling engine. For example, the modeling engine is the dynamic bidder of the system architecture 600 and the dynamic bidder includes a first modeling function directed to the pCVR model, a second modeling function directed to the RoAS controller, and a third modeling function directed to the CoAS controller.

In some embodiments, the system architecture 600 can identify one of the one or more campaigns for evaluation by the modeling engine. In some embodiments, the system architecture 600 can identify items and keywords from the one of the one or more campaigns. In some embodiments, the system architecture 600 can process the items and the keywords from the one of the one or more campaigns using the modeling engine. In some embodiments, the system architecture 600 can generate performance metrics for the one of the one or more campaigns. In some embodiments, the system architecture 600 can perform the method 400 (FIG. 4).

Returning to FIG. 3, in several embodiments, communication system 311 can at least partially perform activity 410 (FIG. 4), activity 420 (FIG. 4), activity 460 (FIG. 4), and/or activity 470 (FIG. 4).

In several embodiments, evaluation system 312 can at least partially perform activity 430 (FIG. 4), and/or activity 440 (FIG. 4).

In a number of embodiments, analysis system 313 can at least partially perform activity 450 (FIG. 4).

In a number of embodiments, web server 320 can at least partially perform method 400.

Although systems and methods for dynamic bidding analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Embodiments disclosed herein are directed to a dynamic bidding system which is optimizes adjustment of advertiser base bids dynamically in real time. Embodiments disclosed herein are directed to two bidding systems operating together to produce a dynamic bid. In some embodiments, a Conversion-RoAS based bid takes different objectives such as content, environment and past performance into consideration to determine the optimal bidding price in real time. A pCVR based bid is an end-to-end scalable production system which provides bid price considering context of users' request and item features in real time.

Embodiments disclosed herein also include a bid simulation and evaluation framework to benchmark different bidding settings.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:

one or more processors; and one or more non-transitory computer-readable media storing computing instructions that, when run on the one or more processors, cause the one or more processors to perform operations comprising:

receiving, from a user device and via a network, a search query and user session information that indicates information regarding an input device, of the user device, selecting one or more portions of a plurality portions, of a website of a graphical user interface, displayed based on the search query being inputted via the website;

receiving, from a database system, input information corresponding to one or more campaigns configured for the website to provide, via the network and for display by the user device within the website, to the user device and including interaction information regarding graphical user interface interaction with the one or more campaigns within the website;

performing an eligibility check on the input information based on interaction of one or more input devices with displayed campaign information;

removing, based on performing the eligibility check and from the input information, one or more portions of the input information that do not pass the eligibility check;

providing, after removing the one or more portions from the input information, the input information to one or more functions configured to:

determine a first bid for the one or more campaigns based on the search query and the user session information by determining a conversion rate (pCVR) bid by dividing a conversion rate for one or more items by a potential conversion return on advertisement spending ($CoAS_{goal}$); and determine a second bid for the one or more campaigns based on the input information by a conversion return on advertisement spending (RoAS) bid by:

determining a RoAS bid by dividing a RoAS for an item, of the one or more items, by a RoAS for a campaign, determining a cost on advertisement spending (CoAS) bid by dividing an order volume/ad spend for the item by a CoAS for the campaign, and aggregating the RoAS bid and the CoAS bid by using an equation that is based on average of bid price of the item in a time window, a first weight for the RoAS bid, a second weight for the CoAS bid, and an hour level adjustment factor for capturing campaign and hourly level variation;

using a dynamic, online function to determine a final bid for the one or more campaigns based on one or more outputs, from the one or more functions, indicating the first bid and the second bid;

transmitting the final bid to a ranking system to generate a listing that includes positioning information corresponding to a position that a graphical user interface element, for a campaign of the one or more campaigns, is to be placed within the graphical user interface; and causing the graphical user interface to be modified to reposition graphical user interface elements based on the positioning information.

2. The system of claim 1, wherein the operations further comprise:

determining query content for the search query, the query content corresponding to at least one of a title, a product type, a department, or a brand; and determining a user intent based on the query content and the user session information.

3. The system of claim 1, wherein the input information further includes order information.

4. The system of claim 1, wherein the first bid is the pCVR bid, and wherein determining the pCVR bid includes using an equation comprising:

$$pCVR \text{ based Bid} = \frac{cvr_i}{CoAS_{goal}}.$$

5. The system of claim 1, wherein the second bid is the conversion RoAS bid, and wherein determining the conversion RoAS bid for the one or more campaigns comprises:

determining the RoAS bid based on input information;

determining the CoAS bid based on the input information; and aggregating the RoAS bid and the CoAS bid to determine the conversion RoAS bid.

6. The system of claim 1, wherein determining the RoAS bid includes using an equation comprising:

17                                                        18

$$\frac{RoAS_i}{RoAS_{campaign}}.$$

7. The system of claim 1, wherein determining the CoAS bid includes using an equation comprising:

$$\frac{CoAS_i}{CoAS_{campaign}}.$$

8. The system of claim 5, wherein the equation comprises:

dynamic $\text{bid}_i(t+1) = \text{avg\_bid}_i(t - \text{delta}, t) \times$ $$\sqrt{\overline{w}_1 \cdot \frac{\dfrac{CoAS_i}{CoAS_{campaign}}}{CoAS\_bidController} + \overline{w}_2 \cdot \frac{\dfrac{RoAS_i}{RoAS_{campaign}}}{RoAS\_bidController}} \cdot \text{day\_part\_adj}_{campaign}(t+1).$$

9. The system of claim 1,
wherein the operations further comprise building a modeling engine based one the first bid, the second bid, and the final bid,
wherein each of the first bid, the second bid, and the final bid correspond to separate modeling functions in the modeling engine, and
wherein the modeling functions include the one or more functions.

10. The system of claim 9, further comprising:
identifying one of the one or more campaigns for evaluation by the modeling engine;
identifying items and keywords from the one of the one or more campaigns;
processing the items and the keywords from the one of the one or more campaigns using the modeling engine; and
generating performance metrics for the one of the one or more campaigns.

11. A method implemented via execution of computing instructions configured to run at one or more processors and stored at one or more non-transitory computer-readable media, the method comprising:
receiving a search query and user session information that indicates information regarding an input device, of the user device, selecting one or more portions of a plurality portions, of a graphical user interface, displayed based on the search query;
receiving input information corresponding to one or more campaigns and including interaction information regarding graphical user interface interaction with the one or more campaigns;
executing, based on the input information, one or more functions configured to:
determine a first bid, for the one or more campaigns and based on the search query and the user session information, that includes a conversion rate (pCVR) bid; and
determine a second bid, for the one or more campaigns and based on the input information, that includes a conversion return on advertisement spending (RoAS) bid by:
determining a RoAS bid by dividing a RoAS for an item by a RoAS for a campaign,
determining a cost on advertisement spending (CoAS) bid by dividing an order volume/ad spend for the item by a CoAS for the campaign, and
aggregating the RoAS bid and the CoAS bid;

executing a dynamic function to determine a final bid for the one or more campaigns based on one or more outputs, from the one or more functions, indicating the first bid and the second bid;
generating, based on the final bid positioning information corresponding to a position that a graphical user interface element, for a campaign of the one or more campaigns, is to be placed within the graphical user interface; and
enabling the graphical user interface to be modified based on the positioning information.

12. The method of claim 11, further comprising:
determining query content for the search query, the query content corresponding to at least one of a title, a product type, a department, or a brand; and
determining a user intent based on the query content and the user session information.

13. The method of claim 11, wherein the input information further includes order information.

14. The method of claim 11,
wherein the first bid is the pCVR bid,
wherein determining the first bid includes using an equation comprising:

$$pCVR \text{ based Bid} = \frac{cvr_i}{CoAS_{goal}},$$

wherein $cvr_i$ corresponds to a conversion rate, and
wherein $CoAS_{goal}$ corresponds to a potential conversion return on advertisement spending.

15. The method of claim 11,
wherein the second bid is the conversion RoAS bid, and
wherein determining the second bid comprises:
determining the RoAS bid based on input information;
determining the CoAS bid based on the input information; and
aggregating the RoAS bid and the CoAS bid to determine the conversion RoAS bid.

16. The method of claim 11, wherein determining the RoAS bid includes using an equation comprising:

$$\frac{RoAS_i}{RoAS_{campaign}}.$$

17. The method of claim 11, wherein determining the CoAS bid includes using an equation comprising:

$$\frac{CoAS_i}{CoAS_{campaign}}.$$

18. The method of claim 11, wherein aggregating the RoAS bid and the CoAS bid to determine the conversion RoAS bid includes using an equation comprising:

dynamic $\text{bid}_i(t+1) = \text{avg\_bid}_i(t - \text{delta}, t) \times$ $$\sqrt{\overline{w}_1 \cdot \frac{\dfrac{CoAS_i}{CoAS_{campaign}}}{CoAS\_bidController} + \overline{w}_2 \cdot \frac{\dfrac{RoAS_i}{RoAS_{campaign}}}{RoAS\_bidController}} \cdot \text{day\_part\_adj}_{campaign}(t+1).$$

19. The method of claim 11, wherein each of the first bid, the second bid, and the final bid correspond to separate modeling functions in a modeling engine, and wherein the modeling functions include the one or more functions.

20. The method of claim 19, further comprising:

identifying one of the one or more campaigns for evaluation by the modeling engine;

identifying items and keywords from the one of the one or more campaigns;

processing the items and the keywords from the one of the one or more campaigns using the modeling engine; and generating performance metrics for the one of the one or more campaigns.

* * * * *